(12) United States Patent
Gu et al.

(10) Patent No.: US 8,406,552 B1
(45) Date of Patent: Mar. 26, 2013

(54) FAST IN-LOOP FILTERING IN VC-1

(75) Inventors: Zi Gu, Shanghai (CN); Jia Bao, Shanghai (CN)

(73) Assignee: Marvell International Ltd. (BM)

(*) Notice: Subject to any disclaimer, the term of this patent is extended or adjusted under 35 U.S.C. 154(b) by 1289 days.

(21) Appl. No.: 12/171,905

(22) Filed: Jul. 11, 2008

Related U.S. Application Data

(60) Provisional application No. 60/950,221, filed on Jul. 17, 2007.

(51) Int. Cl.
*G06K 9/40* (2006.01)

(52) U.S. Cl. .......................................... 382/268; 382/260

(58) Field of Classification Search ............. 370/240.01, 370/240.12, 240.18, 240.23, 240.24, 240.25, 370/240.29; 382/233, 260, 261, 264, 265, 382/268
See application file for complete search history.

(56) References Cited

U.S. PATENT DOCUMENTS

| | | | | |
|---|---|---|---|---|
| 7,683,914 B1* | 3/2010 | Cote | ............................. | 345/606 |
| 2002/0110030 A1* | 8/2002 | Champion | .................... | 365/200 |
| 2004/0246258 A1* | 12/2004 | Champion | .................... | 345/531 |
| 2007/0112762 A1* | 5/2007 | Brubaker | .......................... | 707/5 |
| 2008/0123750 A1* | 5/2008 | Bronstein et al. | ........ | 375/240.24 |
| 2011/0103490 A1* | 5/2011 | Kuo | .......................... | 375/240.29 |

OTHER PUBLICATIONS

Iverson, V. et al., "Real-Time H.264/AVC Codec on Intel Architectures", Proceedings of the 2004 International Conference on Image Processing, vol. 2, Oct. 24-27, 2004, pp. 757-760.
Lee, Juyup et al., "H.264 Decoder Optimization Exploiting SIMD Instructions", Proceedings of the 2004 IEEE Asia Pacific Conference on Circuits and Systems, vol. 2, Dec. 6-9, 2004, pp. 1149-1152.
Prasad, Anjaneya et al., "Optimization and Comparison of Computational Complexities of Standard Compliant Video Decoders on SIMD Processor", Proceedings of the 2007 International Conference of Acoustics, Speech, and Signal Processing, vol. 2, Apr. 15-20, 2007, pp. II-93-II-96.

* cited by examiner

*Primary Examiner* — Hassan Phillips
*Assistant Examiner* — Ajay Cattungal

(57) ABSTRACT

A method of filtering a pixels along a block edge during decoding of compressed VC-1 video includes loading edge segments with pixels along the sides of a block edge into registers, calculating a selection mask for a third pixel pair, and filtering the pixels in the edge segments simultaneously in the registers, if the selection mask meets a predetermined criteria. In another embodiment, a method of filtering pixels along a block edge during decoding of compressed VC-1 video includes loading edge segments with pixels along the side of a block edge into registers, swapping a first pair of the pixels with a second pair of the pixels, where each of the pairs of pixels are third pixel pairs of their respective segments, filtering the pairs of pixels simultaneously in the registers, and filtering the remaining pixels of the respective edge segments, if the results of filtering the third pixels pairs meet a predetermined criteria. The registers may be single instruction multiple data (SIMD) registers used with a Wireless MMX processor.

25 Claims, 14 Drawing Sheets

FAST IN-LOOP FILTERING IN VC-1

CROSS-REFERENCE TO RELATED APPLICATION

This application claims the benefit of U.S. Provisional Application No. 60/950,221, filed Jul. 17, 2007, which is hereby incorporated by reference in its entirety.

TECHNICAL FIELD

The invention relates to video compression. More particularly, the invention relates to in-loop filtering of edge pixels during decoding of compressed video.

BACKGROUND

Video compression and decompression reduces the amount of data used to represent video images. The VC-1 video codec standard (also known as SMPTE 421M) is a type of video compression and decompression that is used by HD DVD, Blu-ray DVD, and the Windows Media Video 9, for example. When decoding compressed video according to the VC-1 standard, and when the Main Profile or Advanced Profile of Windows Media Video 9 is applied, the pixels making up horizontal and vertical edges between blocks in a video image may be in-loop filtered. The in-loop filtering eliminates pixel blockiness and other undesirable artifacts that may be caused by quantization and inverse discrete cosine transform operations performed during the video compression encoding process. In addition, the in-loop filtering may help make the overall video smoother and increase its picture quality.

In-loop filtering is performed inside the decoding loop for a block after the block has been reconstructed and before the block is used as a reference for motion predictive coding. In-loop filtering, as opposed to out-loop filtering, is specified by the VC-1 standard as a mandatory step inside the decoding loop. For pictures containing intra-coded blocks (I pictures) or bi-directional inter-coded blocks (B pictures), in-loop filtering occurs at every pixel row and column that is a multiple of eight. For pictures containing inter-coded blocks (P pictures), in-loop filtering is applied to every 8×8 block boundary of intra-coded blocks, and is applied to 8×8, 8×4, 4×8, and 4×4 block boundaries of inter-coded blocks, depending on their residual coefficient and motion vector conditions. In particular, the boundaries between coded (e.g., with at least one non-zero coefficient) 8×4, 4×8, or 4×4 sub-blocks within an 8×8 block are always filtered. The boundary between a block or sub-block and neighboring block or sub-block is not filtered if both have the same motion vector and both have no residual error (e.g., there are no transform coefficients); otherwise, both are filtered.

FIG. 1 shows a prior art representation of exemplary blocks 102 and 104 in a video image. Each of the blocks 102 and 104 is four pixels wide by four pixels high. The blocks 102 and 104 are separated by a horizontal edge 106. The pixels along the edge 106 are divided into segments 108 and 110 and may be filtered by an in-loop filter. According to the VC-1 standard, the third pixel pair 112 is filtered first, and the result of this filtering determines whether the remaining pixels in the segments 108 and 110 are filtered. The pixel luminance and/or chrominance values are updated after filtering. For example, if the results of filtering pixels P34 and P35 in the third pixel pair 112 meet predetermined criteria, then the pixels P14, P24, P44, P15, P25, and P45 in segments 108 and 110 would be filtered one at a time. However, if the result of filtering pixels P34 and P35 do not meet the predetermined criteria, then the remaining pixels in segments 108 and 110 are unchanged. The predetermined criteria may include whether the third pixel pair clip value is greater than zero. In addition, the intermediate values a0, a1, a2, and a3 from multi-tap filters applied to boundary pixels may be compared with each other and to a picture quantizer scale value PQUANT to decide the predetermined criteria. The PQUANT value may be constant for each block.

Similarly, FIG. 2 shows a prior art representation of exemplary blocks 202 and 204 in a video image. Each of the blocks 202 and 204 is four pixels wide by four pixels high. In contrast to FIG. 1, the blocks 202 and 204 in FIG. 2 are separated by a vertical edge 206. The pixels along the edge 206 are divided into segments 208 and 210. In the VC-1 standard, the third pixel pair 212 including pixels P43 and P53 is filtered first. If the results of the filtering meet predetermined criteria, the pixels P41, P42, P44, P51, P52, and P54 in segments 208 and 210 would then be filtered one at a time. However, if the result of filtering pixels P43 and P53 do not meet the predetermined criteria, then the remaining pixels in segments 208 and 210 are unchanged.

In conventional VC-1 decoding, such as shown in FIGS. 1 and 2, the in-loop filter may occupy a significant portion of the decoding process. As more computing resources and computation cycles are devoted to in-loop filtering in the decoding process, other tasks and operations may have a lower priority and power consumption may increase. Also, decoding video images may take longer and result in unsatisfactory performance if in-loop filtering takes up a large portion of the decoding process. Therefore, it would be desirable to provide faster in-loop filtering during decoding in the VC-1 standard that avoids these drawbacks.

SUMMARY

The present invention is defined by the following claims, and nothing in this section should be taken as a limitation on those claims.

By way of introduction, the embodiments described below provide a method of filtering pixels along a block edge during decoding of compressed video including loading a first edge segment into a first register, the first edge segment including a first plurality of pixels along a first side of the block edge; loading a second edge segment into a second register, the second edge segment including a second plurality of pixels along a second side of the block edge, the second side being parallel to the first side; calculating a selection mask for a pair of pixels, the pair including a third pixel of the first edge segment and a third pixel of the second edge segment; and filtering the first and second plurality of pixels in the first and second edge segments simultaneously in the first and second registers, if the selection mask meets one or more predetermined criteria. The first and second plurality of pixels in each of the first and second edge segments may include four pixels, and the first and second edge segments may be oriented horizontally or vertically. The first and second registers may be single instruction multiple data registers. The decoding of the compressed video may conform to the VC-1 standard. A related system is also disclosed.

In another embodiment, a method of filtering pixels along a block edge during decoding of compressed video includes loading first, second, third, and fourth edge segments into first, second, third, and fourth registers, respectively, wherein the first and second edge segments include a first plurality of pixels along a first side of the block edge, the third and fourth edge segments include a second plurality of pixels along a second side of the block edge, the second side being parallel to the first side; swapping a first pair of pixels from the first and third registers with a second pair of pixels from the second and fourth registers, wherein the first pair includes a first pixel of the first edge segment and a first pixel of the third edge segment, and the second pair includes a third pixel of the second edge segment and a third pixel of the fourth edge segment; filtering the second pair and a third pair of pixels simultaneously in the first and third registers, the third pair including a third pixel of the first edge segment and a third pixel of the third edge segment; filtering remaining pixels of the first and third edge segments, if results of filtering the third pair meet one or more predetermined criteria; and filtering remaining pixels of the second and fourth edge segments, if results of filtering the second pair meet the one or more predetermined criteria.

Each of the first, second, third, and fourth edge segments may include four pixels. The first, second, third, and fourth edge segments may be oriented horizontally or vertically. The first, second, third, and fourth registers may include single instruction multiple data registers. The decoding of the compressed video may conform to the VC-1 standard. The steps of swapping, filtering the second pair and the third pair, filtering remaining pixels of the first and third edge segments, and filtering remaining pixels of the second and fourth edge segments may be performed if the block edge is in an intra macroblock or a bidirectional macroblock. Alternatively, the steps of swapping, filtering the second pair and the third pair, filtering remaining pixels of the first and third edge segments, and filtering remaining pixels of the second and fourth edge segments are performed if the block edge is in a predicted macroblock and if the first, second, third, and fourth edge segments are to be filtered, based on a size, a residual coefficient, and a motion vector of the predicted macroblock. A related system is also disclosed.

Each of the embodiments described herein can be used alone or in combination with one another. The embodiments will now be described with reference to the attached drawings.

BRIEF DESCRIPTION OF THE DRAWINGS

FIG. 11(*b*) is a functional block diagram of a digital versatile disk (DVD).

FIG. 11(*c*) is a functional block diagram of a high definition television.

FIG. 11(*d*) is a functional block diagram of a vehicle control system.

FIG. 11(*e*) is a functional block diagram of a cellular phone.

FIG. 11(*f*) is a functional block diagram of a set top box.

FIG. 11(*g*) is a functional block diagram of a media player.

FIG. 11(*h*) is a functional block diagram of a VoIP phone.

DETAILED DESCRIPTION

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

By way of overview, the embodiments described herein relate to a method of filtering pixels along a block edge during decoding of compressed video. In the disclosed embodiments, the method may include loading a first edge segment into a first register, the first edge segment including a first plurality of pixels along a first side of the block edge; loading a second edge segment into a second register, the second edge segment including a second plurality of pixels along a second side of the block edge, the second side being parallel to the first side; calculating a selection mask for a pair of pixels, the pair including a third pixel of the first edge segment and a third pixel of the second edge segment; and filtering the first and second plurality of pixels in the first and second edge segments simultaneously in the first and second registers, if the selection mask meets one or more predetermined criteria.

An alternative method of filtering pixels along a block edge during decoding of compressed video may include loading first, second, third, and fourth edge segments into first, second, third, and fourth registers, respectively, wherein the first and second edge segments include a first plurality of pixels along a first side of the block edge, the third and fourth edge segments include a second plurality of pixels along a second side of the block edge, the second side being parallel to the first side; swapping a first pair of pixels from the first and third registers with a second pair of pixels from the second and fourth registers, wherein the first pair includes a first pixel of the first edge segment and a first pixel of the third edge segment, and the second pair includes a third pixel of the second edge segment and a third pixel of the fourth edge segment; filtering the second pair and a third pair of pixels simultaneously in the first and third registers, the third pair including a third pixel of the first edge segment and a third pixel of the third edge segment; filtering remaining pixels of the first and third edge segments, if results of filtering the third pair meet one or more predetermined criteria; and filtering remaining pixels of the second and fourth edge segments, if results of filtering the second pair meet the one or more predetermined criteria.

Figure 1:
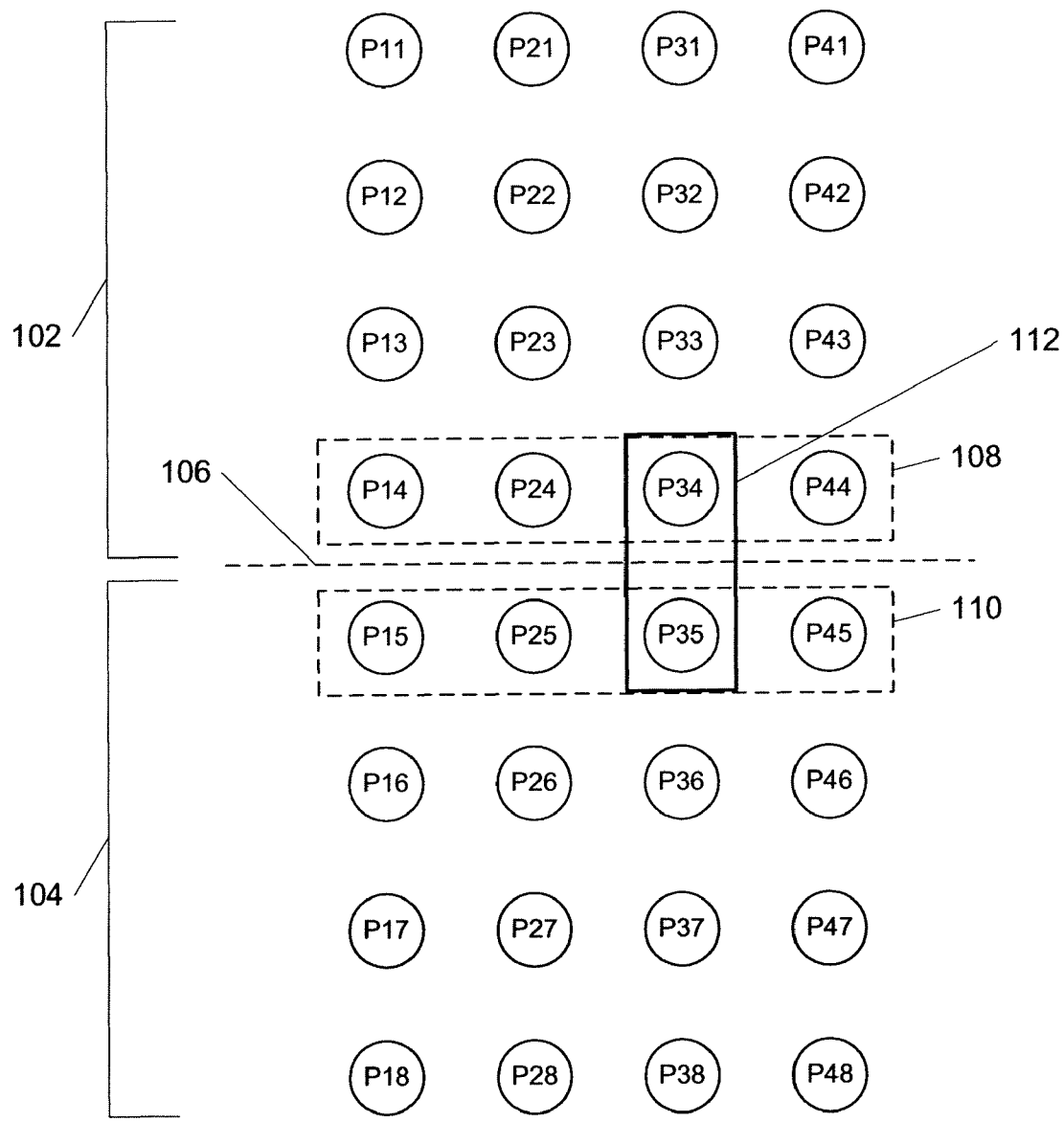
FIG. 1 is a prior art diagram of horizontally separated blocks in a video image.
Figure 2:
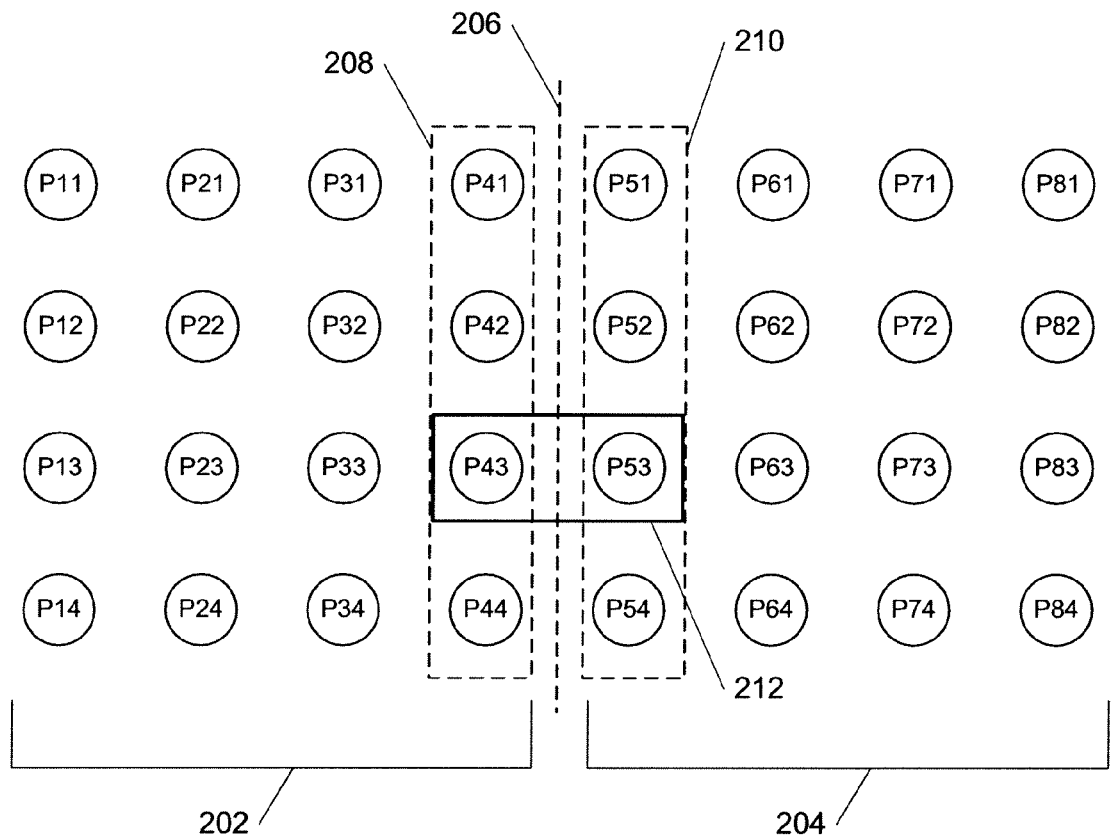
FIG. 2 is a prior art diagram of vertically separated blocks in a video image.
Figure 3:
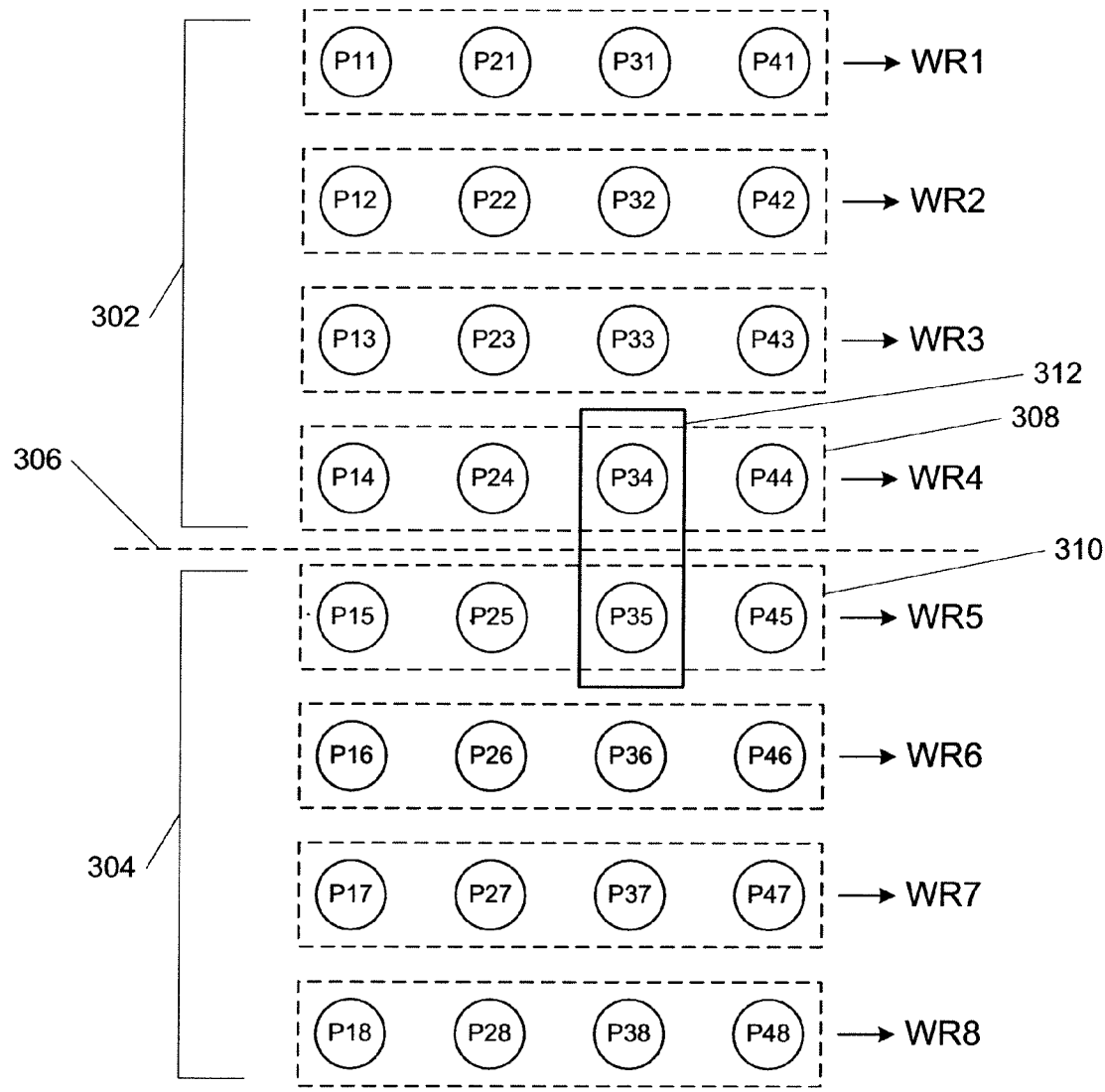
FIG. 3 is a diagram of horizontally separated blocks in a video image according to a first embodiment.

FIG. 3 is a diagram of horizontally separated blocks 302 and 304 in a video image according to a first embodiment. Each of the blocks 302 and 304 is four pixels wide by four pixels high. The blocks 302 and 304 are separated by a horizontal edge 306. The pixels along the edge 306 are divided into segments 308 and 310. The pixels in segments 308 and 310 may be filtered by an in-loop filter if a valid selection mask from the third pixel pair 312 meets predetermined criteria. Each of the pixels in segments 308 and 310 may be represented by a byte or another number of bits, and includes information about the pixel luminance and/or chrominance value. The predetermined criteria may include whether the third pixel pair clip value is greater than zero. In addition, the intermediate values a0, a1, a2, and a3 of multi-tap filters applied to boundary pixels may be compared with each other and to a picture quantizer scale value PQUANT to decide the predetermined criteria. The PQUANT value may be constant for each block.

The segments 308 and 310 may be loaded into single instruction multiple data (SIMD) registers. Using SIMD registers takes advantage of data-level parallelism. A SIMD processor views SIMD registers as multiple data elements and may operate on all of the SIMD registers at one time. Although a SIMD processor may have its own registers, the bit width of the SIMD registers determines the amount of achievable parallelism. A SIMD register may be 64 or 128 bits wide, for example. If a SIMD register is 64 bits wide, then a SIMD processor may perform eight single-byte operations, four half-word (two-byte) operations, two word (four-byte) operations, or one double-word (eight-byte) operation in a single cycle.

Therefore, if each pixel is represented by 16 bits (two bytes), then a four-pixel wide segment could be loaded into a 64-bit wide register, for example. In FIG. 3, segment 308 is loaded into register WR4 and segment 310 is loaded into register WR5. In some embodiments, the other segments of the blocks 302 and 304 may also be loaded into registers, for example, registers WR1, WR2, WR3, WR6, WR7, and WR8. In other embodiments, registers WR4 and WR5 are loaded when filtering begins, registers WR3 and WR6 are loaded when an intermediate value a0 is calculated, and registers WR1, WR2, WR7, and WR8 are loaded when intermediate values a1 and a2 are calculated. If the intermediate values are not needed due to meeting early exit criteria, loading of some of the registers may not be necessary. The SIMD registers may be Wireless MMX registers or other types of registers that allow for parallel processing of data. In other embodiments, the segments may be loaded into other types of data storage, for example, a cache or random access memory.

A selection mask for the third pixel pair 312 is calculated. For example, calculation of the selection mask may include calculation of a clip value for the third pixel pair 312, determining whether the clip value is nonzero, and determining whether the absolute value of the clip value is positive. Calculating the selection mask may also include determining whether the absolute value of the intermediate value a0 is greater than the intermediate value a3, and determining whether the intermediate value a0 is nonzero. The selection mask calculation may further include determining whether the absolute value of the intermediate value a0 is less than the PQUANT value. The calculated selection mask includes a Boolean result for each pixel pair. If the selection mask meets the predetermined criteria, then all of the pixels in segments 308 and 310 that have been loaded into registers WR4 and WR5, respectively, are filtered simultaneously. The pixels may be filtered simultaneously due to the parallel data processing capabilities of the SIMD register. However, if the selection mask does not meet the predetermined criteria, then the pixels in segments 308 and 310 are unchanged.

Figure 4:
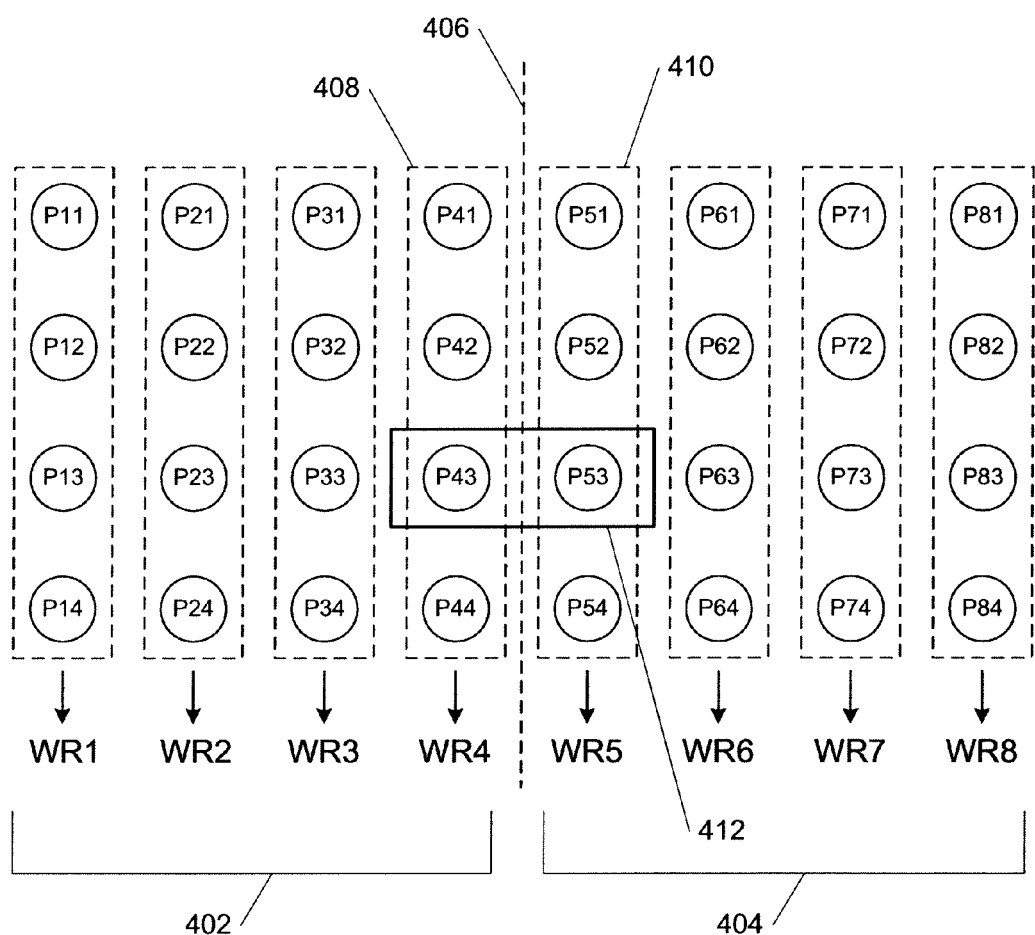
FIG. 4 is a diagram of vertically separated blocks in a video image according to the first embodiment.

FIG. 4 is a diagram of vertically separated blocks 402 and 404 in a video image according to the first embodiment. Similar to FIG. 3, each of the blocks 402 and 404 is four pixels wide by four pixels high, but the blocks 402 and 404 are separated by a vertical edge 406. The pixels along the edge 406 are divided into segments 408 and 410. The pixels in segments 408 and 410 may be filtered by an in-loop filter if a valid selection mask from the third pixel pair 412 meets predetermined criteria. Each of the pixels in segments 408 and 410 may be represented by a byte or any other number of bits and loaded into SIMD registers. In FIG. 4, segment 408 is loaded into register WR4 and segment 410 is loaded into register WR5. In some embodiments, the other segments of the blocks 402 and 404 may also be loaded into registers, for example, registers WR1, WR2, WR3, WR6, WR7, and WR8. The registers may be loaded and transposed so that the pixels are stored in the registers as shown in FIG. 4.

A selection mask for the third pixel pair 412 is calculated. For example, the selection mask may include calculation of a clip value for the third pixel pair 412, determining whether the clip value is nonzero, and determining whether the absolute value of the clip value is positive. The selection mask may also include determining whether the absolute value of an intermediate value a0 is greater than an intermediate value a3, and determining whether the intermediate value a0 is nonzero. The selection mask may further include determining whether the absolute value of the intermediate value a0 is less than the PQUANT value. If the selection mask meets the predetermined criteria, then all of the pixels in segments 408 and 410 that have been loaded into registers WR4 and WR5, respectively, are filtered simultaneously. However, if the selection mask does not meet the predetermined criteria, then the pixels in segments 408 and 410 are unchanged.

Figure 5:
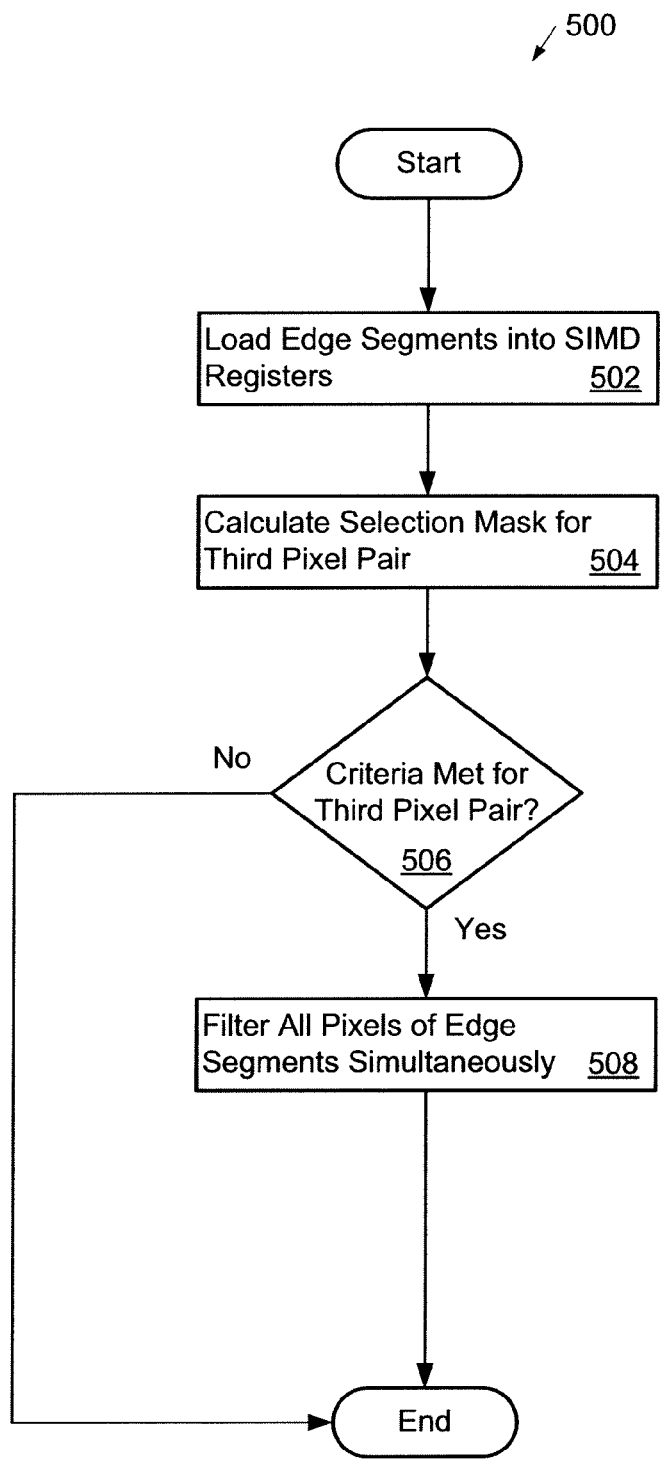
FIG. 5 is a flowchart that represents a method of in-loop filtering according to the first embodiment.

FIG. 5 is a flowchart that represents a method 500 of in-loop filtering according to the first embodiment. The method 500 may filter all pixels of edge segments along a filtering edge when performing VC-1 decoding of a video image. At Act 502, pixels in edge segments along a horizontal or vertical filtering edge are loaded into single instruction multiple data (SIMD) registers. The edge segments may be included in blocks of a video image, and may include four pixels, for example. Other numbers of pixels may be included in the edge segments. Each pixel that is loaded into the SIMD registers is represented by a byte or other number of bits, and includes information about the pixel luminance and/or chrominance value. Pixels included in other segments that are not along the filtering edge may also be loaded into SIMD registers at Act 502.

At Act 504, a selection mask is calculated for the third pixel pair of the edge segments. According to the VC-1 standard, the characteristics of the third pixel pair determine whether the pixels of the edge segments are in-loop filtered. For example, the selection mask may include calculation of a clip value of the third pixel pair, determining whether the clip value is nonzero, and determining whether the absolute value of the clip value is positive. The selection mask may also include determining whether the absolute value of an intermediate value a0 is greater than an intermediate value a3, and determining whether the intermediate value a0 is nonzero. The selection mask may further include determining whether the absolute value of the intermediate value a0 is less than a picture quantizer scale value PQUANT. At Act 506, it is determined whether the calculated selection mask from Act 504 meets predetermined criteria. If the selection mask does not meet the predetermined criteria, the method 500 is complete. However, if the selection mask does meet the predetermined criteria, the method 500 continues to Act 508. At Act 508, all pixels of the edge segments are simultaneously filtered. Due to the parallel nature of the SIMD registers, the pixels may be simultaneously filtered, which may result in savings in computing resources and time, and decoding performance improvement.

Figure 6:
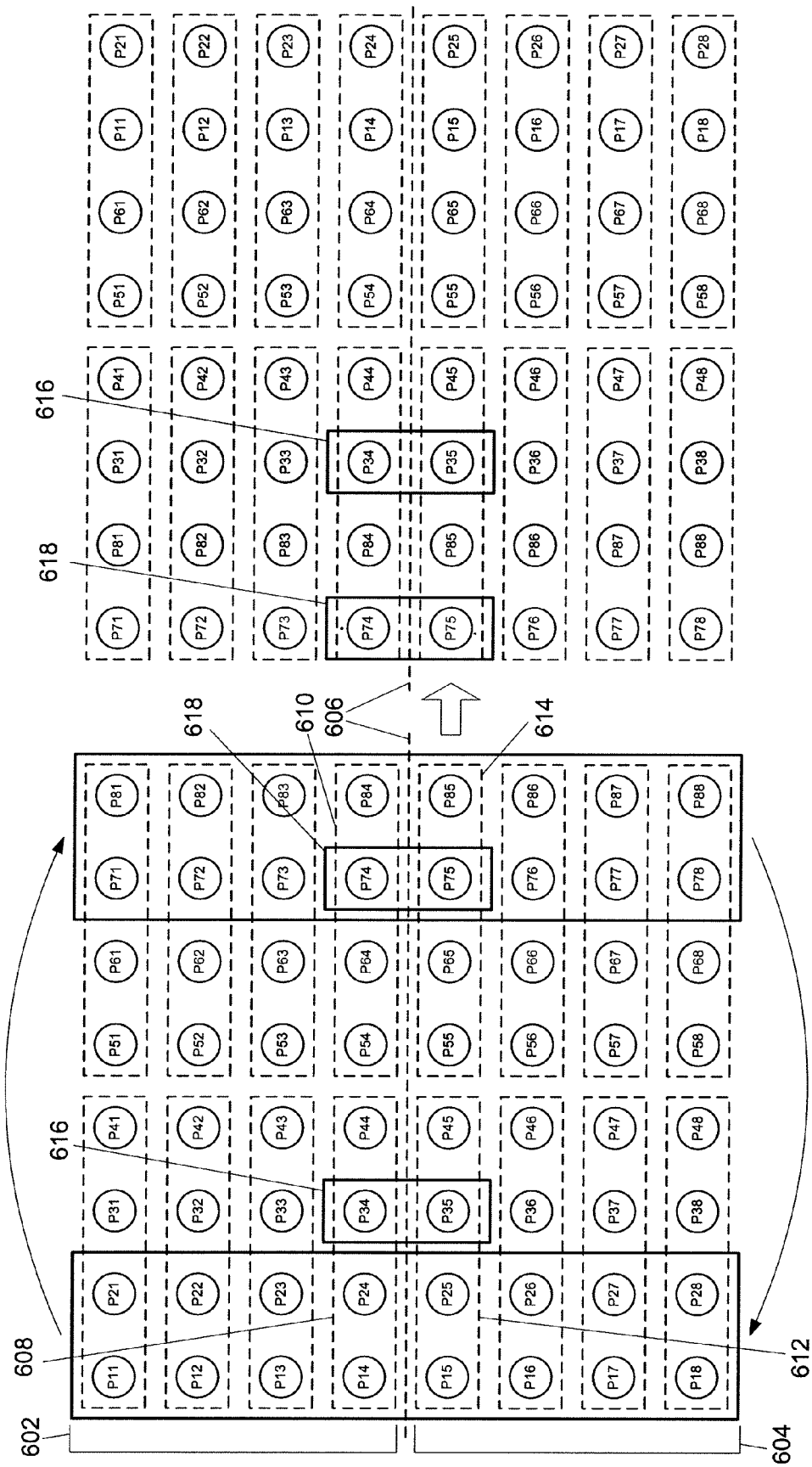
FIG. 6 is a diagram of horizontally separated blocks in a video image according to an alternative embodiment.

FIG. 6 is a diagram of horizontally separated blocks 602 and 604 in a video image according to an alternative embodiment. Each of the blocks 602 and 604 is eight pixels wide by four pixels high. The blocks may be other widths and heights, such as eight pixels wide by eight pixels high, four pixels wide by eight pixels high, or four pixels wide by four pixels high. The blocks 602 and 604 are separated by a horizontal edge 606. The pixels along the edge 606 are divided into multiple segments. In block 602, there are segments 608 and 610, and in block 604, there are segments 612 and 614. Depending on the number of pixels along a dividing edge, the number of segments in other embodiments may vary.

The pixels in segments 608, 610, 612, and 614 may be filtered by an in-loop filter if the filtering results of third pixel pairs of segments 608 and 612 and segments 610 and 614, respectively, meet predetermined criteria. The predetermined criteria, as defined by the VC-1 standard, includes that (1) the slope of the third pixel pair clip value is non-zero; (2) the intermediate value a0 is non-zero; (3) the absolute value of the intermediate value a0 is less than the PQUANT constant; and (4) the intermediate value a3 is less than the absolute value of the intermediate value a0. Each of the intermediate values a0 and a3, and the clip value are defined in the VC-1 standard. Each of the pixels may be represented by a byte or another number of bits and includes information about the pixel luminance and/or chrominance value. The segments 608, 610, 612, and 614 may be loaded into SIMD registers. In other embodiments, all of the segments that compose the blocks 602 and 604 may also be loaded into SIMD registers. The SIMD registers may be Wireless MMX registers or other types of registers that allow for parallel processing of data.

Segments 608 and 612 include a third pixel pair 616 containing pixels P34 and P35. Segments 610 and 614 include a third pixel pair 618 containing pixels P74 and P75. Each of the third pixel pairs 616 and 618 may be filtered to determine whether the remaining pixels of the segments 608, 610, 612, and 614 will also be filtered. To take advantage of the parallelism of the SIMD registers, the third pixel pair 618 may be moved so that both third pixel pairs 616 and 618 are in the same SIMD registers. When the third pixel pairs 616 and 618 are in the same registers, they may be filtered together to determine whether the remaining pixels in some or all of the segments 608, 610, 612, and 614 will also be filtered. Due to spatial continuity of the video image, the neighboring segments 608, 610, 612, and 614 may have the same characteristics such that either all of the segments are filtered or none of them are filtered.

On the left side of FIG. 6, the third pixel pairs 616 and 618 are with their respective segments. On the right side of FIG. 6, the third pixel pair 618 containing pixels P74 and P75 is swapped with pixels P14 and P15 so that the third pixel pairs 616 and 618 reside in the same SIMD registers. Both third pixel pairs 616 and 618 may then be filtered simultaneously. If the results of filtering the third pixel pairs 616 and 618 both meet predetermined criteria, then the remaining pixels in segments 608, 610, 612, and 614 are filtered simultaneously. If the results of filtering one of the third pixel pairs 616 and 618 meet the predetermined criteria, then the remaining pixels in their respective segment are filtered simultaneously. Finally, if the results of filtering the third pixel pairs 616 and 618 both do not meet the predetermined criteria, then the remaining pixels in segments 608, 610, 612, and 614 are unchanged.

Figure 7:
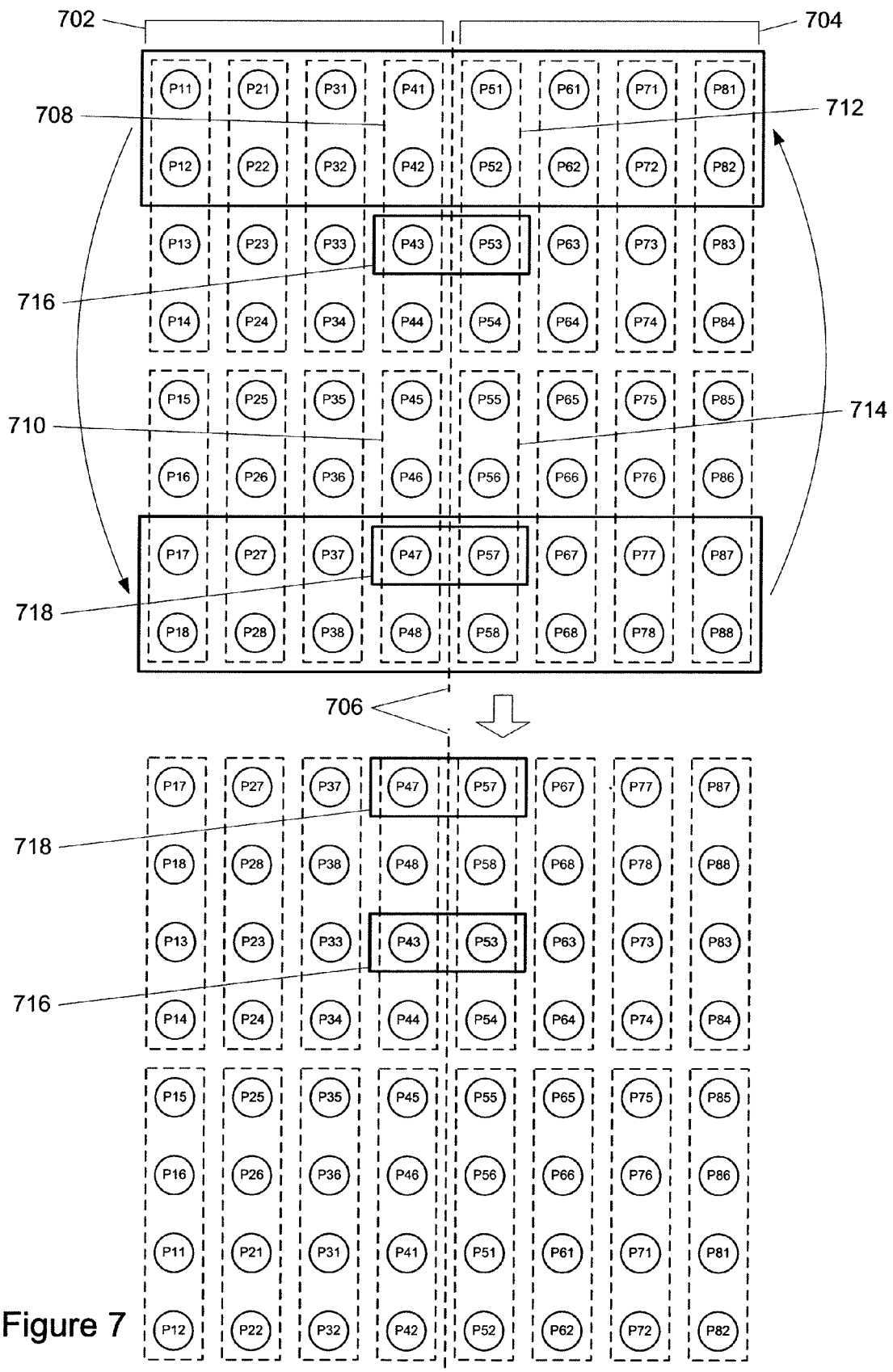
FIG. 7 is a diagram of vertically separated blocks in a video image according to the alternative embodiment.

FIG. 7 is a diagram of vertically separated blocks 702 and 704 in a video image according to the alternative embodiment. Each of the blocks 702 and 704 is four pixels wide by eight pixels high and may be other widths and heights. The blocks 702 and 704 are separated by a vertical edge 706. The pixels along the edge 706 are divided into multiple segments. In block 702, there are segments 708 and 710, and in block 704, there are segments 712 and 714. The pixels in segments 708, 710, 712, and 714 may be filtered by an in-loop filter if the filtering results of third pixel pairs of segments 708 and 712 and segments 710 and 714, respectively, meet predetermined criteria. Each of the pixels may be represented by a byte or another number of bits. The segments 708, 710, 712, and 714 may be loaded into SIMD registers.

Segments 708 and 712 include a third pixel pair 716 containing pixels P43 and P53. Segments 710 and 714 include a third pixel pair 718 containing pixels P47 and P57. Each of the third pixel pairs 716 and 718 may be filtered to determine whether the remaining pixels of the segments 708, 710, 712, and 714 will also be filtered. To take advantage of the parallelism of the SIMD registers, the third pixel pair 718 may be moved so that both third pixel pairs 716 and 718 are in the same SIMD registers.

On the top of FIG. 7, the third pixel pairs 716 and 718 are with their respective segments. On the bottom of FIG. 7, the third pixel pair 718 containing pixels P47 and P57 is swapped with pixels P41 and P51 so that the third pixel pairs 716 and 718 reside in the same SIMD registers. Both third pixel pairs 716 and 718 may then be filtered simultaneously. If the results of filtering the third pixel pairs 716 and 718 both meet predetermined criteria, then the remaining pixels in segments 708, 710, 712, and 714 are filtered simultaneously. If the results of filtering one of the third pixel pairs 716 and 718 meet the predetermined criteria, then the remaining pixels in their respective segment are filtered simultaneously. Finally, if the results of filtering the third pixel pairs 716 and 718 both do not meet the predetermined criteria, then the remaining pixels in segments 708, 710, 712, and 714 are unchanged.

Figure 8:
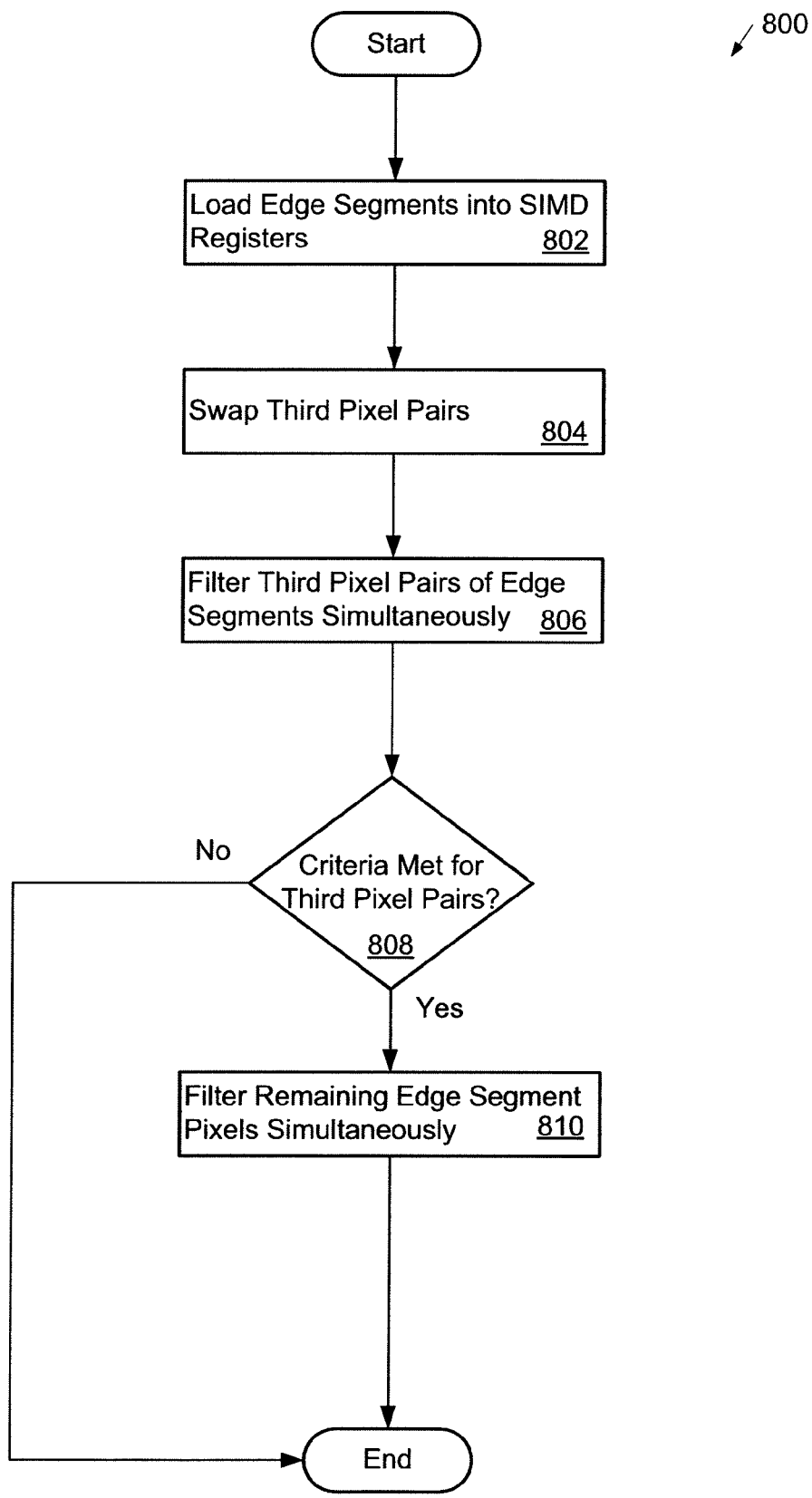
FIG. 8 is a flowchart that represents a method of in-loop filtering for intra and bi-directional macroblocks, according to the alternative embodiment.

FIG. 8 is a flowchart that represents a method 800 of in-loop filtering for intra and bi-directional macroblocks, according to the alternative embodiment. A macroblock is a group of blocks within a video image. Macroblocks may be used during encoding and decoding of compressed video to predict changes in the video image. An intra macroblock may refer only to the current video image to predict changes. A bi-directional macroblock may refer to two previous, current, and/or subsequent video images to predict changes. A predicted macroblock may refer to one previous, current, or subsequent video image to predict changes. Depending on the type of macroblock being decoded, in-loop filtering may be performed following the method 800 or a method 900 described in FIG. 9.

The method 800 may filter all pixels of edge segments along a filtering edge when performing VC-1 decoding of a video image for intra and bi-directional macroblocks. At Act 802, pixels in edge segments along a horizontal or vertical filtering edge are loaded into single instruction multiple data (SIMD) registers. The edge segments loaded at Act 802 include two sets of edge segments, for example, such as those described above in reference to FIGS. 6 and 7. Each pixel loaded into the SIMD registers is represented by a byte or other number of bits. Pixels included in other segments that are not along the filtering edge may also be loaded into SIMD registers at Act 802.

At Act 804, the third pixel pairs for the edge segments may be swapped so that the third pixel pairs are in the same SIMD registers. The VC-1 standard specifies that the result of filtering the third pixel pair of an edge segment determines whether the remaining pixels of the edge segments are in-loop filtered. By having the third pixel pairs for the multiple edge segments in the same SIMD registers, the third pixel pairs may be simultaneously filtered to determine whether their respective segments will subsequently be filtered. At Act 806, the third pixel pairs that are in the same SIMD registers are simultaneously filtered. At Act 808, it is determined whether the result of filtering the third pixel pairs from Act 806 meets predetermined criteria. If the results do not meet the predetermined criteria, the method 800 is complete. However, if the results do meet the predetermined criteria, the method 800 continues to Act 810. At Act 810, the remaining pixels in the edge segments are filtered simultaneously. Due to the parallel nature of the SIMD registers, the pixels may be simultaneously filtered to help save computing resources and time, and improve the performance of the decoding process.

Figure 9:
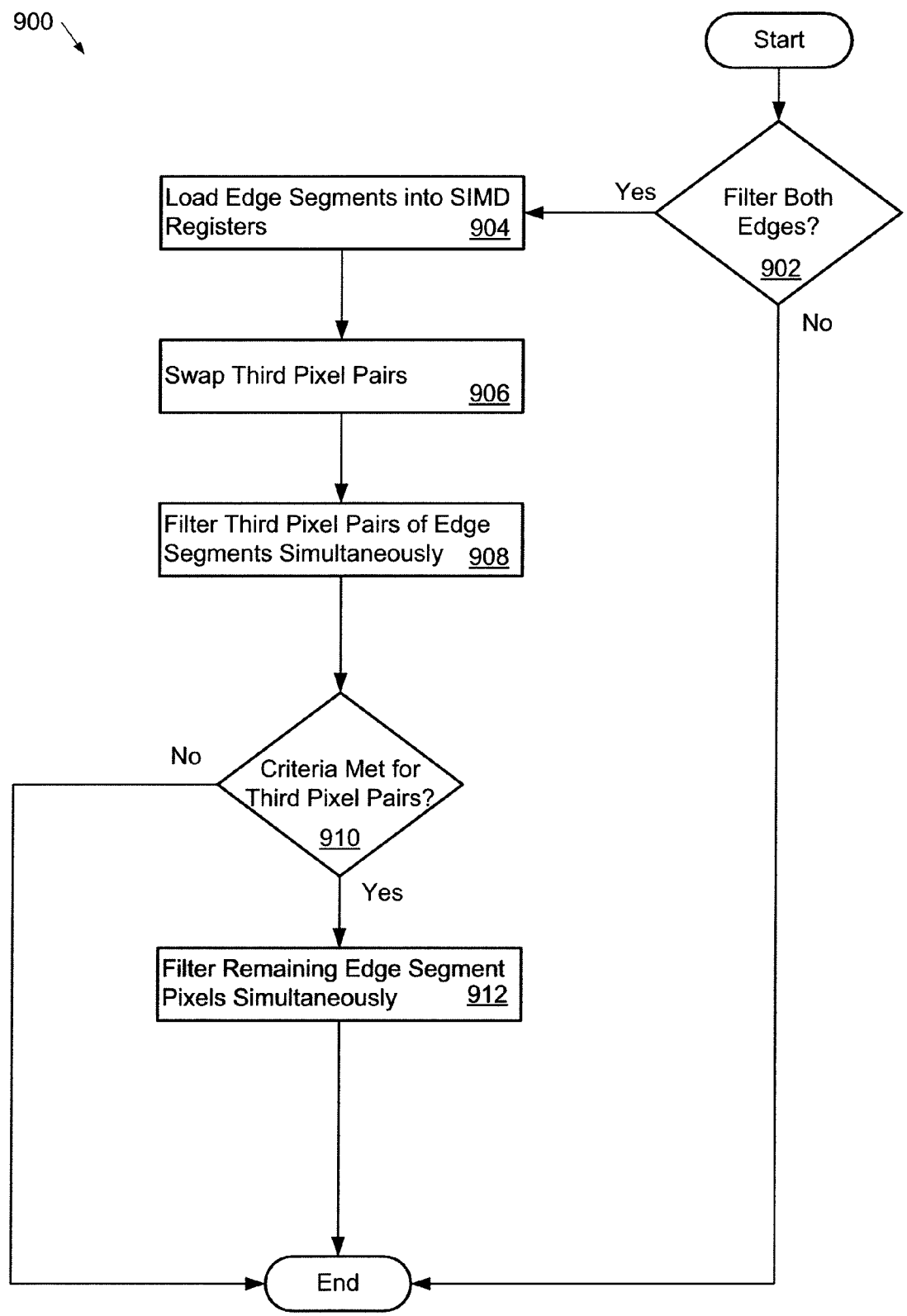
FIG. 9 is a flowchart that represents a method of in-loop filtering for predicted macroblocks, according to the alternative embodiment.

FIG. 9 is a flowchart that represents a method 900 of in-loop filtering for predicted macroblocks, according to the alternative embodiment. The method 900 may filter all pixels of edge segments along a filtering edge when performing VC-1 decoding of a video image for predicted macroblocks, which may refer to previous or current video images to predict changes in the compressed video. At Act 902, it is determined whether both edge segments in a predicted macroblock are to be filtered. With reference to FIG. 6, for example, the edge segments at issue at Act 902 would be edge segments 608 and 612, and 610 and 614. The edge segments are filtered at Act 902 at every 8×8 block boundary of intra-coded blocks, and at 8×8, 8×4, 4×8, and 4×4 block boundaries of inter-coded blocks, depending on their residual coefficient and motion vector conditions. In particular, the boundaries between coded (e.g., with at least one non-zero coefficient) 8×4, 4×8, or 4×4 sub-blocks within an 8×8 block are always filtered. The boundary between a block or sub-block and neighboring block or sub-block is not filtered if both have the same motion vector and both have no residual error (e.g., there are no transform coefficients); otherwise, both are filtered.

If both edge segments are not to be filtered, then the method 900 is complete. At this point, the edge segment which is to be filtered may be filtered by a process such as in method 500, for example, or the edge segments may remain unchanged. However, if both edge segments are to be filtered at Act 902, then the method 900 continues to Act 904. At Act 904, pixels in edge segments along a horizontal or vertical filtering edge are loaded into single instruction multiple data (SIMD) registers. The edge segments loaded at Act 904 include two sets of edge segments, for example, such as those described above in reference to FIGS. 6 and 7. At Act 906, the third pixel pairs for the edge segments may be swapped so that they are in the same SIMD registers. The VC-1 standard specifies that the result of filtering the third pixel pair of an edge segment determines whether the remaining pixels of the edge segments are in-loop filtered. By having the third pixel pairs for the multiple edge segments in the same SIMD registers, the third pixel pairs may be simultaneously filtered to determine whether their respective segments will also be filtered. At Act 908, the third pixel pairs that are in the same SIMD registers are simultaneously filtered. At Act 910, it is determined whether the result of filtering the third pixel pairs from Act 908 meets predetermined criteria. If the results do not meet the predetermined criteria, the method 900 is complete. However, if the results do meet the predetermined criteria, the method 900 continues to Act 912. At Act 912, the remaining pixels in the edge segments are filtered simultaneously.

Figure 10:
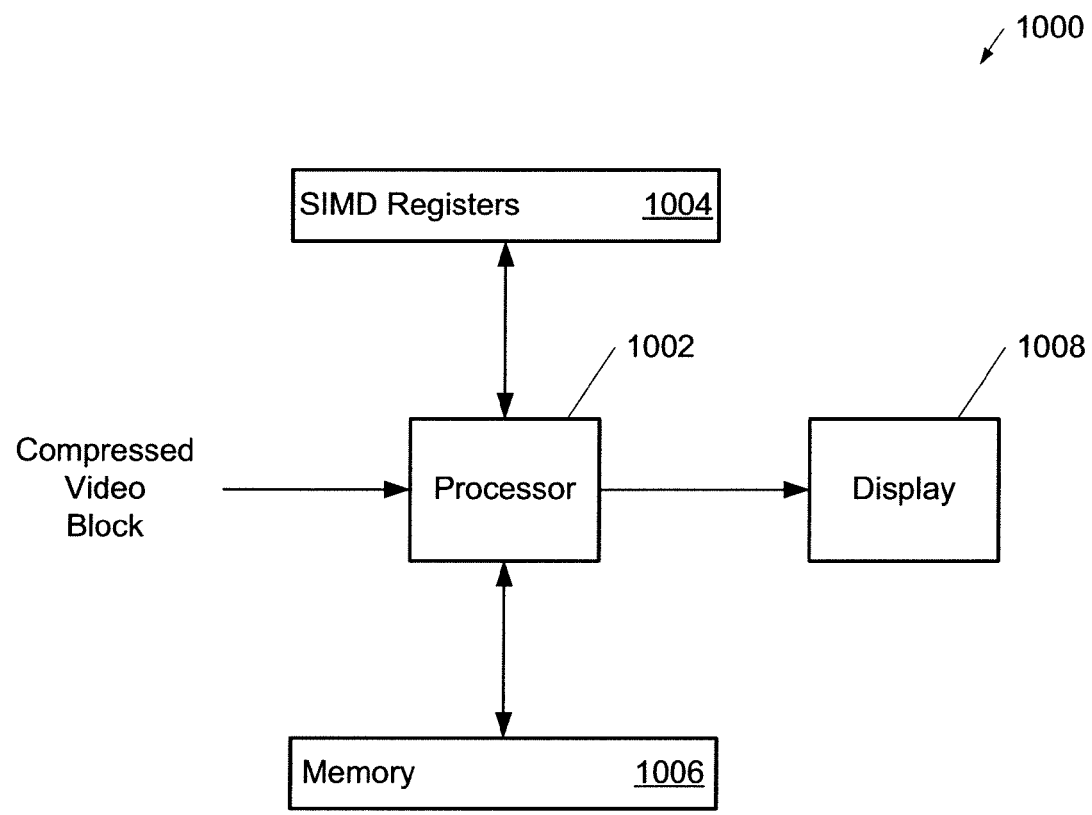
FIG. 10 is a block diagram of an in-loop filtering system.
Figure 11A:
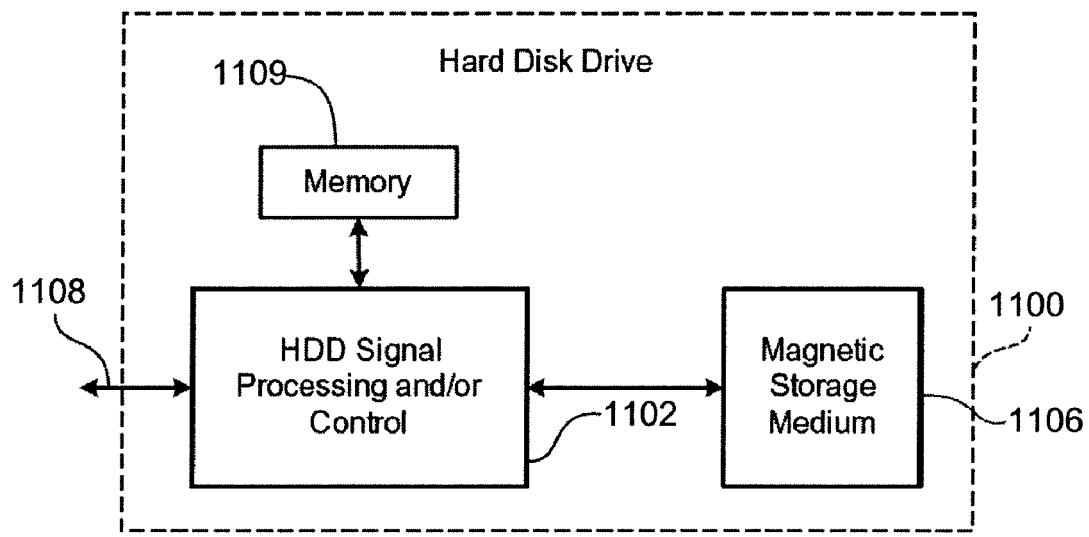
FIG. 11(*a*) is a functional block diagram of a hard disk drive.
Figure 11B:
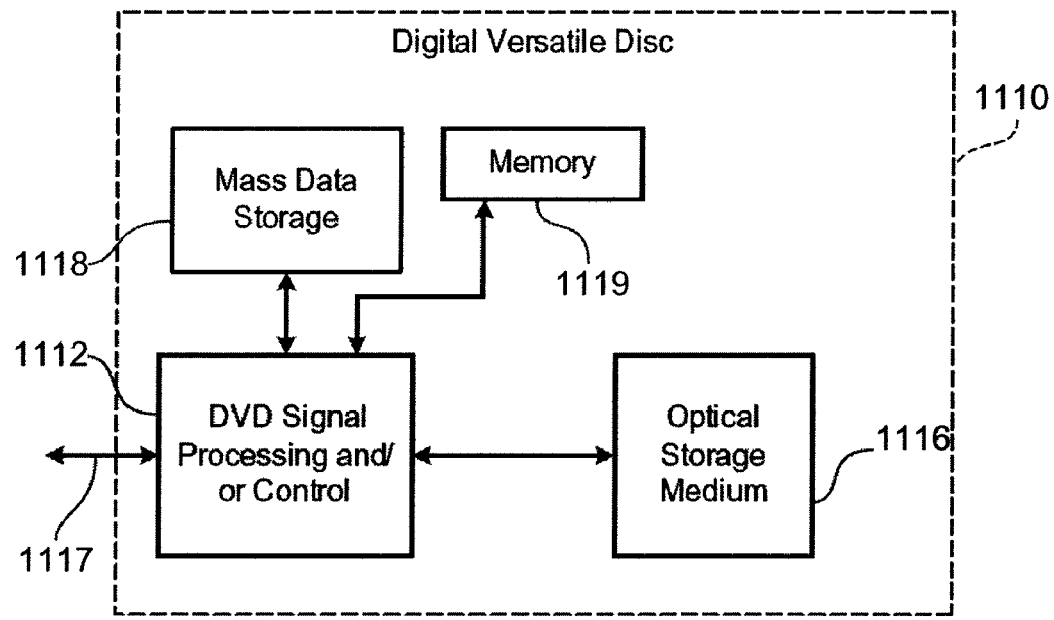
Figure 11C:
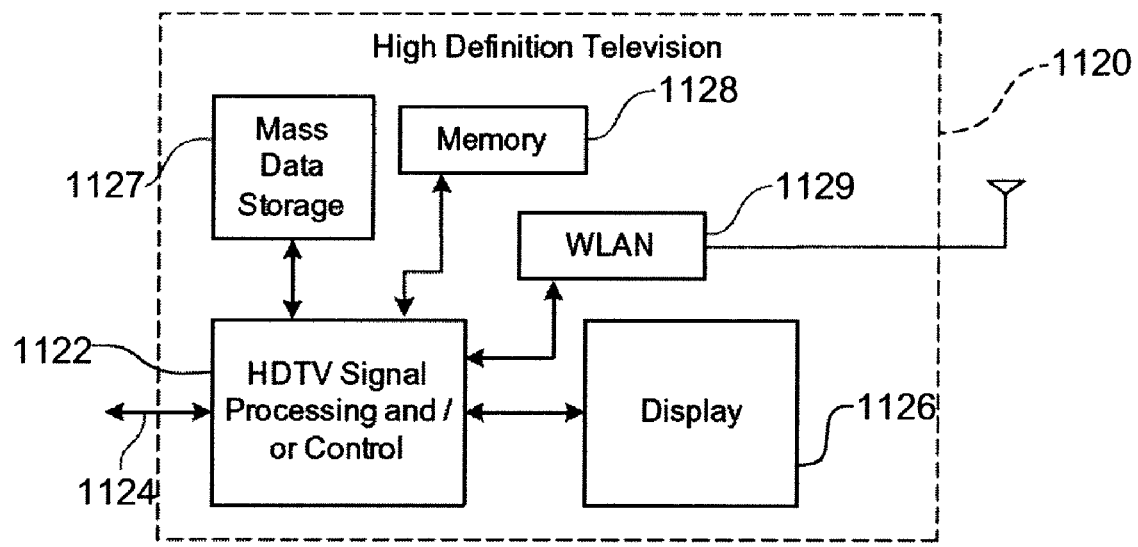
Figure 11D:
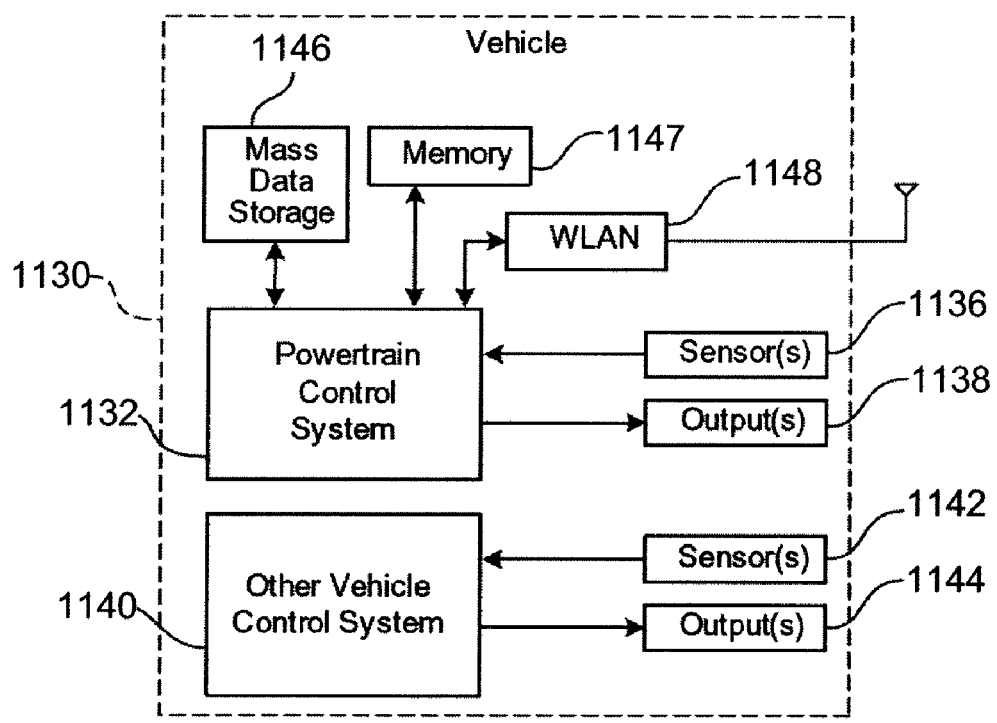
Figure 11E:
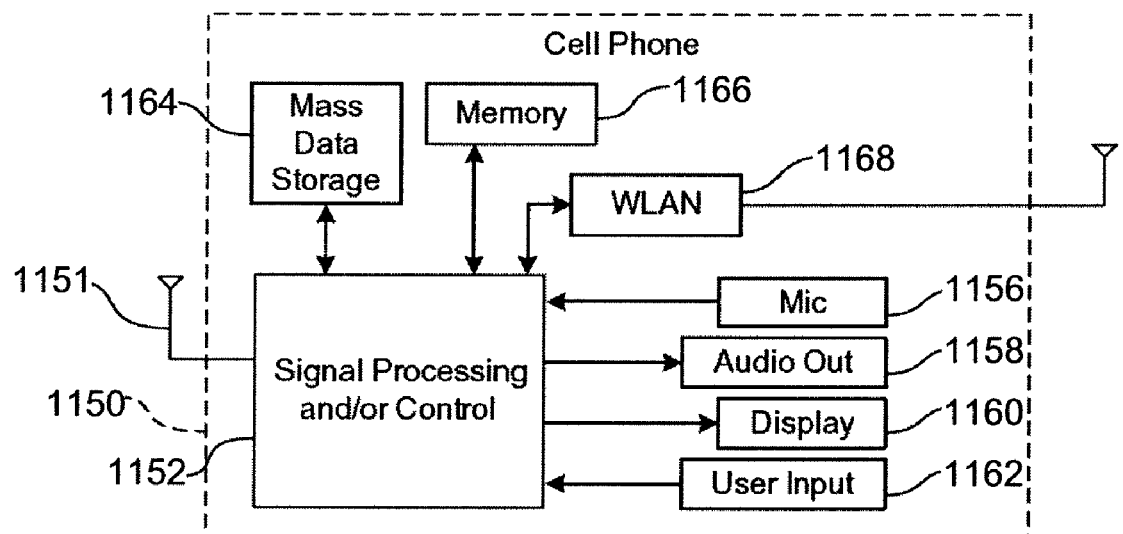
Figure 11F:
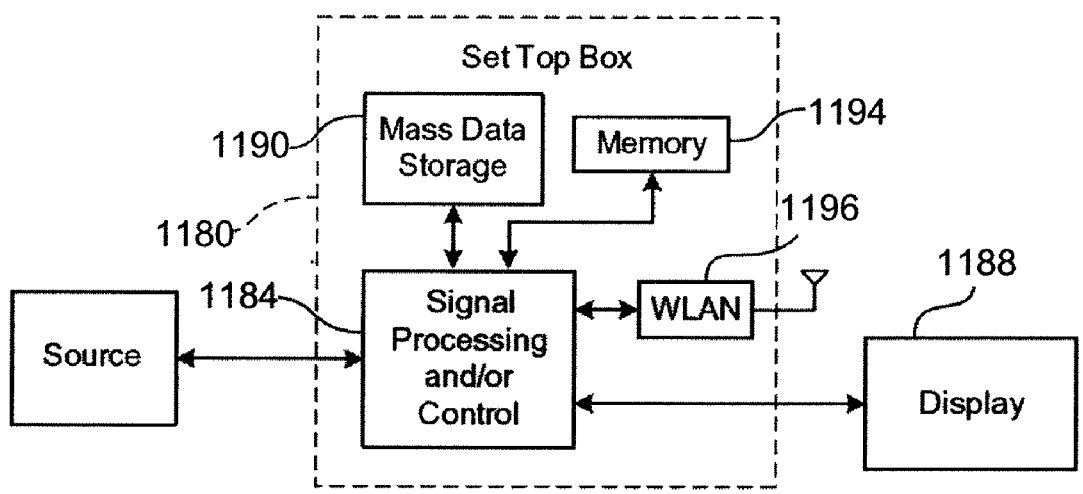
Figure 11G:
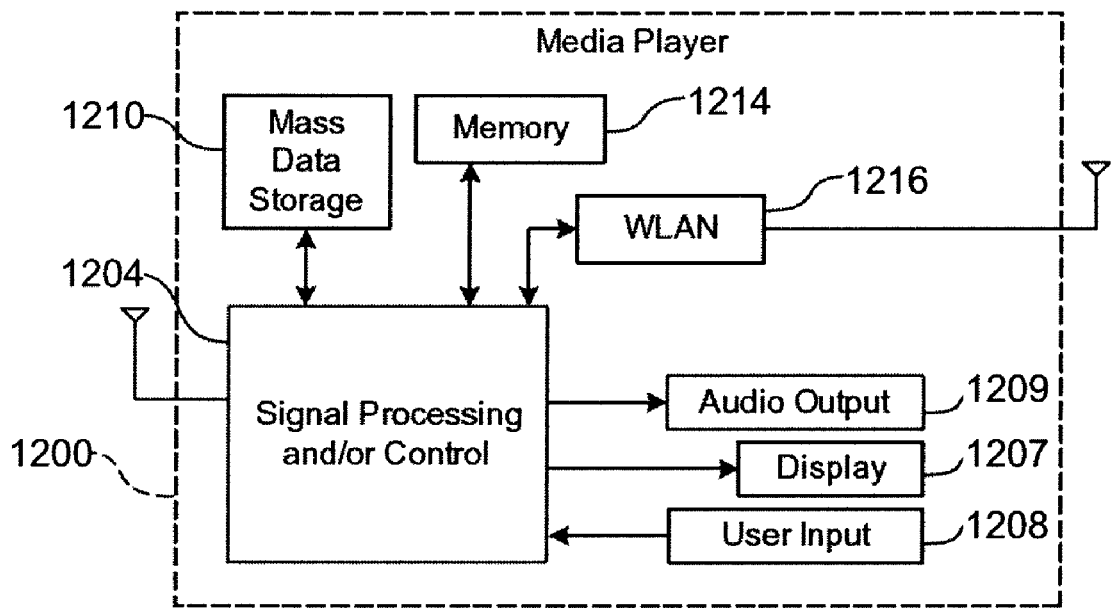
Figure 11H:
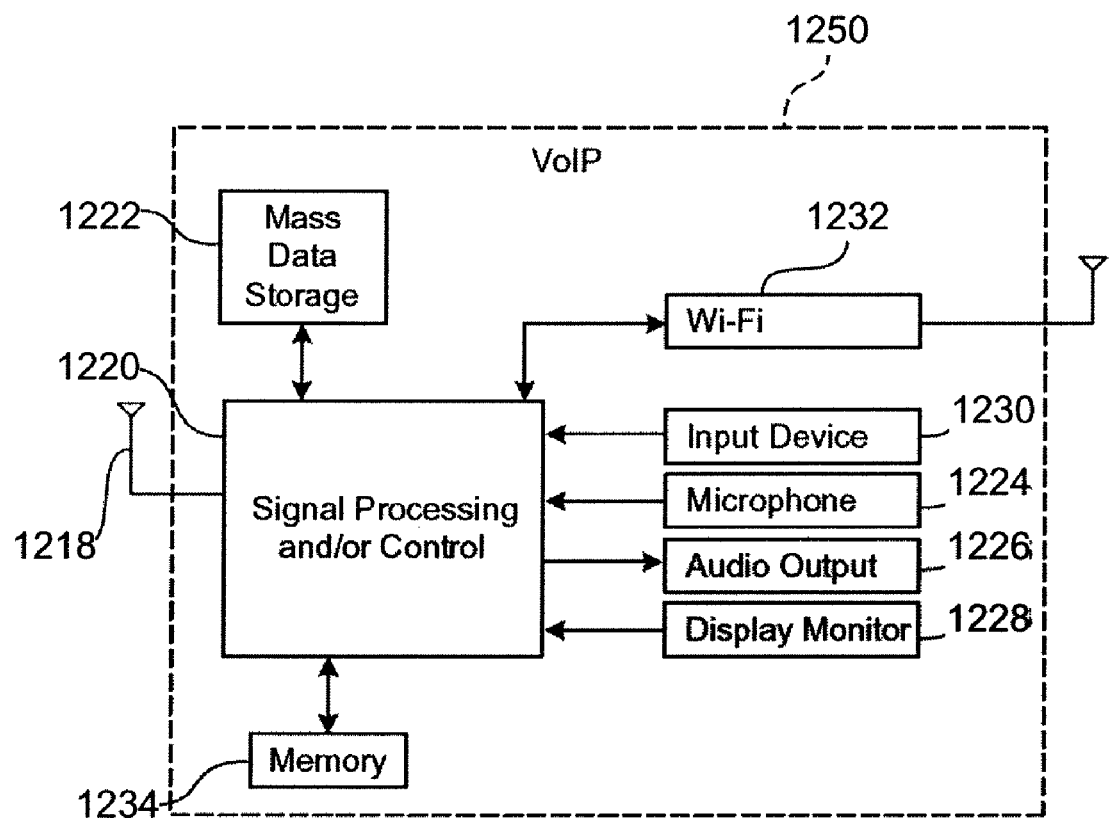

FIG. 10 is a block diagram of an in-loop filtering system 1000. The system 1000 may filter a plurality of pixels along a block edge during decoding of compressed video. Data including compressed video block information may be received by a processor 1002 from an external source, such as from a reconstruction stage of a VC-1 decoder. The compressed video block information may include pixels composing blocks in a video image, for example. The pixels may be separated into segments, including edge segments that make up boundaries between blocks. The processor 1002 may be a Wireless MMX processor, for example, or other type of processor that allows for parallel processing of data.

Data representing pixels in the edge segments may be loaded in registers 1004 that are in communication with the processor 1002. The registers 1004 may be single instruction multiple data (SIMD) registers, or may be other types of registers that allow for parallel processing of data. The registers may be 32 bits wide, 64 bits wide, or other bit widths. A memory 1006 in communication with the processor 1002 may include processor-executable instructions to perform, for example, the methods 500, 800, and/or 900 described above. The instructions may include calculating a selection mask for a third pixel pair, determining whether the selection mask meets predetermined criteria, and filtering pixels simultaneously. The instructions may also include swapping third pixel pairs, filtering multiple third pixel pairs simultaneously, and determining whether predetermined criteria have been met for the third pixel pairs. The memory 1006 may include the predetermined criteria for the result of filtering third pixel pairs, such as those used at Acts 506, 808, and 910. In addition, the processor 1002 may receive additional control signals (not shown), such as whether both edge segments should be filtered, as at Act 902 of method 900. After filtering the compressed video block information, the filtered pixels may be sent to a display 1008 or other user interface, and may also be stored in the memory 1006 as predictive references for subsequent decoding processes.

Referring now to FIGS. 11(*a*) to 11(*h*), various exemplary implementations of the present invention are shown. Referring to FIG. 11(*a*), the present invention may be embodied in a hard disk drive (HDD) 1100. HDD 1100 may communicate with a host device (not shown) such as a computer, mobile computing devices such as personal digital assistants, cellular phones, media or MP3 players and the like, and/or other devices via one or more wired or wireless communication links 1108.

The present invention may be implemented with either or both signal processing and/or control circuits, which are generally identified in FIG. 11(*a*) at 1102. In some implementations, the signal processing and/or control circuit 1102 and/or other circuits (not shown) in the HDD 1100 may process data, perform coding and/or encryption, perform calculations, and/or format data that is output to and/or received from a magnetic storage medium 1106. HDD 1100 may be connected to memory 1109, such as random access memory (RAM), a low latency nonvolatile memory such as flash memory, read only memory (ROM) and/or other suitable electronic data storage.

Referring now to FIG. 11(*b*), the present invention may be implemented in a digital versatile disc (DVD) drive 1110. The present invention may be implemented in either or both signal processing and/or control circuits, which are generally identified in FIG. 11(*b*) at 1112, and/or mass data storage 1118 of DVD drive 1110. Signal processing and/or control circuit 1112 and/or other circuits (not shown) in DVD drive 1110 may process data, perform coding and/or encryption, perform calculations, and/or format data that is read from and/or data written to an optical storage medium 1116. In some implementations, signal processing and/or control circuit 1112 and/or other circuits (not shown) in DVD drive 1110 can also perform other functions such as encoding and/or decoding and/or any other signal processing functions associated with a DVD drive.

DVD drive 1110 may communicate with a device (not shown) such as a computer, television or other device via one or more wired or wireless communication links 1117. DVD drive 1110 may communicate with mass data storage 1118 that stores data in a nonvolatile manner. Mass data storage 1118 may include a HDD such as that shown in FIG. 11(*a*). The HDD may be a mini HDD that includes one or more platters having a diameter that is smaller than approximately 1.8". DVD drive 1110 may be connected to memory 1119, such as RAM, ROM, low latency nonvolatile memory such as flash memory, and/or other suitable electronic data storage.

Referring now to FIG. 11(*c*), the present invention may be embodied in a high definition television (HDTV) 1120. The present invention may be implemented in either or both signal processing and/or control circuits, which are generally identified in FIG. 11(*c*) at 1122, a WLAN interface 1129 and/or mass data storage 1127 of the HDTV 1120. HDTV 1120 may receive HDTV input signals in either a wired or wireless format via one or more wired or wireless communication links 1124 and generate HDTV output signals for a display 1126. In some implementations, signal processing circuit and/or control circuit 1122 and/or other circuits (not shown) of HDTV 1120 may process data, perform coding and/or encryption, perform calculations, format data and/or perform any other type of HDTV processing that may be required.

HDTV 1120 may communicate with mass data storage 1127 that stores data in a nonvolatile manner such as optical and/or magnetic storage devices. At least one HDD may have the configuration shown in either FIG. 11(*a*) and/or at least one DVD may have the configuration shown in FIG. 11(*b*). The HDD may be a mini HDD that includes one or more platters having a diameter that is smaller than approximately 1.8". HDTV 1120 may be connected to memory 1128 such as RAM, ROM, low latency nonvolatile memory such as flash memory and/or other suitable electronic data storage. HDTV 1120 also may support connections with a WLAN via a WLAN network interface 1129.

Referring now to FIG. 11(*d*), the present invention may be implemented in a control system of a vehicle 1130, a WLAN interface 1148 and/or mass data storage 1146 of the vehicle control system. In some implementations, the present invention is implemented in a power-train control system 1132 that receives inputs from one or more sensors 1136 such as temperature sensors, pressure sensors, rotational sensors, airflow sensors and/or any other suitable sensors and/or that generates one or more output control signals such as engine operating parameters, transmission operating parameters, and/or other control signals at one or more output(s) 1138.

The present invention may also be embodied in other control systems 1140 of vehicle 1130. Control system 1140 may likewise receive signals from input sensors 1142 and/or output control signals to one or more output(s) 1144. In some implementations, control system 1140 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 1132 may communicate with mass data storage 1146 that stores data in a nonvolatile manner. Mass data storage 1146 may include optical and/or magnetic storage devices, for example HDDs and/or DVDs. At least one HDD may have the configuration shown in FIG. 11(*a*) and/or at least one DVD may have the configuration shown in FIG. 11(*b*). The HDD may be a mini HDD that includes one or more platters having a diameter that is smaller than approximately 1.8". Powertrain control system 1132 may be connected to memory 1147 such as RAM, ROM, low latency nonvolatile memory such as flash memory and/or other suitable electronic data storage. Powertrain control system 1132 also may support connections with a WLAN via a WLAN network interface 1148. The control system 1140 may also include mass data storage, memory and/or a WLAN interface (all not shown).

Referring now to FIG. 11(*e*), the present invention may be embodied in a cellular phone 1150 that may include a cellular antenna 1151. The present invention may be implemented in either or both signal processing and/or control circuits, which are generally identified in FIG. 11(*e*) at 1152, a WLAN interface and/or mass data storage of the cellular phone 1150. In some implementations, cellular phone 1150 includes a microphone 1156, an audio output 1158 such as a speaker and/or audio output jack, a display 1160 and/or an input device 1162 such as a keypad, pointing device, voice actuation and/or other input device. Signal processing and/or control circuits 1152 and/or other circuits (not shown) in cellular phone 1150 may process data, perform coding and/or encryption, perform calculations, format data and/or perform other cellular phone functions.

Cellular phone 1150 may communicate with mass data storage 1164 that stores data in a nonvolatile manner such as optical and/or magnetic storage devices, for example HDDs and/or DVDs. At least one HDD may have a configuration shown in FIG. 11(*a*) and/or at least one DVD may have the configuration shown in FIG. 11(*b*). The HDD may be a mini HDD that includes one or more platters having a diameter that is smaller than approximately 1.8". Cellular phone 1150 may be connected to memory 1166 such as RAM, ROM, low latency nonvolatile memory such as flash memory and/or other suitable electronic data storage. Cellular phone 1150 also may support connections with a WLAN via a WLAN network interface 1168.

Referring now to FIG. 11(*f*), the present invention may be embodied in a set top box 1180. The present invention may be implemented in either or both signal processing and/or control circuits, which are generally identified in FIG. 11(*f*) at 1184, a WLAN interface and/or mass data storage of the set top box 1180. Set top box 1180 receives signals from a source such as a broadband source and outputs standard and/or high definition audio/video signals suitable for a display 1188 such as a television and/or monitor and/or other video and/or audio output devices. Signal processing and/or control circuits 1184 and/or other circuits (not shown) of the set top box 1180 may process data, perform coding and/or encryption, perform calculations, format data and/or perform any other set top box function.

Set top box 1180 may communicate with mass data storage 1190 that stores data in a nonvolatile manner. Mass data storage 1190 may include optical and/or magnetic storage devices, for example HDDs and/or DVDs. At least one HDD may have a configuration shown in FIG. 11(*a*) and/or at least one DVD may have the configuration shown in FIG. 11(*b*). The HDD may be a mini HDD that includes one or more platters having a diameter that is smaller than approximately 1.8". Set top box 1180 may be connected to memory 1194 such as RAM, ROM, low latency nonvolatile memory such as flash memory and/or other suitable electronic data storage. Set top box 1180 also may support connections with a WLAN via a WLAN network interface 1196.

Referring now to FIG. 11(*g*), the present invention may be embodied in a media player 1200. The present invention may be implemented in either or both signal processing and/or control circuits, which are generally identified in FIG. 11(*g*) at 1204, a WLAN interface and/or mass data storage of the media player 1200. In some implementations, media player 1200 includes a display 1207 and/or a user input 1208 such as a keypad, touchpad and the like. In some implementations, media player 1200 may employ a graphical user interface (GUI) that typically employs menus, drop down menus, icons and/or a point-and-click interface via display 1207 and/or user input 1208. Media player 1200 further includes an audio output 1209 such as a speaker and/or audio output jack. Signal processing and/or control circuits 1204 and/or other circuits (not shown) of media player 1200 may process data, perform coding and/or encryption, perform calculations, format data and/or perform any other media player function.

Media player 1200 may communicate with mass data storage 1210 that stores data such as compressed audio and/or video content in a nonvolatile manner. In some implementations, the compressed audio files include files that are compliant with MP3 format or other suitable compressed audio and/or video formats. The mass data storage 1210 may include optical and/or magnetic storage devices, for example HDDs and/or DVDs. At least one HDD may have a configuration shown in FIG. 11(*a*) and/or at least one DVD may have the configuration shown in FIG. 11(*b*). The HDD may be a mini HDD that includes one or more platters having a diameter that is smaller than approximately 1.8".

Media player 1200 may be connected to memory 1214 such as RAM, ROM, low latency nonvolatile memory such as flash memory and/or other suitable electronic data storage. Media player 1200 also may support connections with a WLAN via a WLAN network interface 1216. Still other implementations in addition to those described above are contemplated.

Referring to FIG. 11(*h*), the present invention may be embodied in a Voice over Internet Protocol (VoIP) phone 1250 that may include an antenna 1218. The present invention may be implemented in either or both signal processing and/or control circuits, which are generally identified in FIG. 11(*h*) at 1220, a wireless interface and/or mass data storage of the VoIP phone 1250. In some implementations, VoIP phone 1250 includes, in part, a microphone 1224, an audio output 1226 such as a speaker and/or audio output jack, a display monitor 1228, an input device 1230 such as a keypad, pointing device, voice actuation and/or other input devices, and a Wi-Fi communication module 1232. Signal processing and/or control circuits 1220 and/or other circuits (not shown) in VoIP phone 1250 may process data, perform coding and/or encryption, perform calculations, format data and/or perform other VoIP phone functions.

VoIP phone 1250 may communicate with mass data storage 1222 that stores data in a nonvolatile manner such as optical and/or magnetic storage devices, for example HDDs and/or DVDs. At least one HDD may have a configuration shown in FIG. 11(*a*) and/or at least one DVD may have the configuration shown in FIG. 11(*b*). The HDD may be a mini HDD that includes one or more platters having a diameter that is smaller than approximately 1.8". VoIP phone 1250 may be connected to memory 1234, which may be a RAM, ROM, low latency nonvolatile memory such as flash memory and/or other suitable electronic data storage. VoIP phone 1250 is configured to establish communications link with a VoIP network (not shown) via Wi-Fi communication module 1232.

All of the discussion above, regardless of the particular implementation being described, is exemplary in nature, rather than limiting. Although specific components of the fast in-loop filtering in VC-1 system are described, methods, systems, and articles of manufacture consistent with the fast in-loop filtering in VC-1 system may include additional or different components. For example, components of the fast in-loop filtering in VC-1 system may be implemented by one or more of: control logic, hardware, a microprocessor, microcontroller, application specific integrated circuit (ASIC), discrete logic, or a combination of circuits and/or logic. Further, although selected aspects, features, or components of the implementations are depicted as hardware or software, all or part of the systems and methods consistent with the fast in-loop filtering in VC-1 system may be stored on, distributed across, or read from machine-readable media, for example, secondary storage devices such as hard disks, floppy disks, and CD-ROMs; a signal received from a network; or other forms of ROM or RAM either currently known or later developed. Any act or combination of acts may be stored as instructions in computer readable storage medium. Memories may be DRAM, SRAM, Flash or any other type of memory. Programs may be parts of a single program, separate programs, or distributed across several memories and processors.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs and rule sets may be parts of a single program or rule set, separate programs or rule sets, or distributed across several memories and processors.

It is intended that the foregoing detailed description be understood as an illustration of selected forms that the invention can take and not as a definition of the invention. It is only the following claims, including all equivalents, that are intended to define the scope of this invention.

What is claimed is:

1. A method of filtering pixels along a block edge during decoding of compressed video, comprising:
    loading a first edge segment into a first register, the first edge segment comprising a first plurality of pixels along a first side of the block edge;
    loading a second edge segment into a second register, the second edge segment comprising a second plurality of pixels along a second side of the block edge, the second side being parallel to the first side;
    loading a third edge segment into a third register, the third edge segment comprising a third plurality of pixels along the first side of the block edge;
    loading a fourth edge segment into a fourth register, the fourth edge segment comprising a fourth plurality of pixels along the second side of the block edge;
    calculating a first selection mask for a first pair of pixels, the first pair comprising a first pixel of the first edge segment and a first pixel of the second edge segment;
    identifying a second pair of pixels, the second pair comprising a second pixel of the first edge segment and a second pixel of the second edge segment;
    calculating a second selection mask for a third pair of pixels, the third pair comprising a pixel of the third edge segment and a pixel of the fourth edge segment;
    swapping the third pair of pixels with the second pair of pixels so that both the first pair of pixels and the third pair of pixels are loaded in the first and second registers;
    simultaneously determining if the first selection mask associated with the first pair and the second selection mask associated with the third air meet one or more predetermined criteria; and
    simultaneously filtering remaining pixels of the first and second edge segments, if the first selection mask meets one or more predetermined criteria.

2. The method of claim 1, wherein the first and second plurality of pixels in each of the first and second edge segments comprise four pixels.

3. The method of claim 1, wherein the first and second edge segments are oriented horizontally or oriented vertically.

4. The method of claim 1, wherein the first and second registers comprise single instruction multiple data registers.

5. The method of claim 1, where calculating each of the first selection mask and the second selection mask comprises one or more of determining if an absolute value of a clip value of the pair of pixels is positive, determining if an absolute value of an intermediate value a0 is greater than an intermediate value a3, determining if the intermediate value a0 value is nonzero, and determining if the absolute value of the intermediate value a0 is less than a picture quantizer scale value PQUANT.

6. The method of claim 1, wherein filtering the first and second plurality of pixels in the first and second edge segments simultaneously in the first and second registers comprises filtering the first and second plurality of pixels in parallel.

7. The method of claim 1, further comprising simultaneously filtering remaining pixels of the third and fourth edge segments, if the second selection mask meets one or more predetermined criteria.

8. A method of filtering pixels along a block edge during decoding of compressed video, comprising:
loading first, second, third, and fourth edge segments into first, second, third, and fourth registers, respectively, wherein the first and second edge segments comprise a first plurality of pixels along a first side of the block edge, the third and fourth edge segments comprise a second plurality of pixels along a second side of the block edge, the second side being parallel to the first side;
swapping a first pair of pixels from the first and third registers with a second pair of pixels from the second and fourth registers, wherein the first pair comprises a first pixel of the first edge segment and a first pixel of the third edge segment, and the second pair comprises a third pixel of the second edge segment and a third pixel of the fourth edge segment;
filtering the second pair and a third pair of pixels simultaneously in the first and third registers, the third pair comprising a third pixel of the first edge segment and a third pixel of the third edge segment;
filtering remaining pixels of the first and third edge segments, if results of filtering the third pair meet one or more predetermined criteria; and
filtering remaining pixels of the second and fourth edge segments, if results of filtering the second pair meet the one or more predetermined criteria.

9. The method of claim 8, wherein each of the first, second, third, and fourth edge segments comprises four pixels.

10. The method of claim 8, wherein the first, second, third, and fourth edge segments are oriented horizontally or oriented vertically.

11. The method of claim 8, wherein the first, second, third, and fourth registers comprise single instruction multiple data registers.

12. The method of claim 8, wherein the decoding of compressed video conforms to the VC-1 standard.

13. The method of claim 8, wherein the steps of swapping, filtering the second pair and the third pair, filtering remaining pixels of the first and third edge segments, and filtering remaining pixels of the second and fourth edge segments are performed if the block edge is in an intra macroblock or a bidirectional macroblock.

14. The method of claim 8, wherein the steps of swapping, filtering the second pair and the third pair, filtering remaining pixels of the first and third edge segments, and filtering remaining pixels of the second and fourth edge segments are performed if the block edge is in a predicted macroblock and if the first, second, third, and fourth edge segments are to be filtered, based on a size, a residual coefficient, and a motion vector of the predicted macroblock.

15. A system for filtering pixels along a block edge during decoding of compressed video, comprising:
first, second, third, and fourth registers;
a processor in communication with the first, and second, third, and fourth registers; and
a memory in communication with the processor, the memory comprising processor executable instructions configured to:
load a first edge segment into the first register, the first edge segment comprising a first plurality of pixels along a first side of the block edge;
load a second edge segment into the second register, the second edge segment comprising a second plurality of pixels along a second side of the block edge, the second side being parallel to the first side;
load a third edge segment into the third register, the third edge segment comprising a third plurality of pixels along the first side of the block edge;
load a fourth edge segment into the fourth register, the fourth edge segment comprising a fourth plurality of pixels along the second side of the block edge;
calculate a first selection mask for a first pair of pixels, the first pair comprising a first pixel of the first edge segment and a first pixel of the second edge segment identify a second pair of pixels, the second pair comprising a second pixel of the first edge segment and a second pixel of the second edge segment;
calculate a second selection mask for a third pair of pixels, the third pair comprising a pixel of the third edge segment and a pixel of the fourth edge segment;
swap the third pair of pixels with the second pair of pixels so that both the first pair of pixels and the third pair of pixels are loaded in the first and second registers;
simultaneously determine if the first selection mask associated with the first pair and the second selection mask associated with the third pair meet one or more predetermined criteria; and
simultaneously filter remaining pixels of the first and second edge segments if the first selection mask meets one or more predetermined criteria.

16. The system of claim 15, wherein the first and second registers comprise single instruction multiple data registers.

17. The system of claim 15, wherein the decoding of compressed video conforms to the VC-1 standard.

18. The system of claim 15, where calculating each of the first selection mask and the second selection mask comprises one or more of determining if an absolute value of a clip value of the pair of pixels is positive, determining if an absolute value of an intermediate value a0 is greater than an intermediate value a3, determining if the intermediate value a0 is nonzero, and determining if the absolute value of the intermediate value a0 is less than a picture quantizer scale value PQUANT.

19. The system of claim 15, wherein the processor executable instructions are configured to filter the first and second plurality of pixels in parallel.

20. A system for filtering pixels along a block edge during decoding of compressed video, comprising:
   first, second, third, and fourth registers;
   a processor in communication with the first, second, third, and fourth registers; and
   a memory in communication with the processor, the memory comprising processor-executable instructions configured to:
      load first, second, third, and fourth edge segments into the first, second, third, and fourth registers, respectively, wherein the first and second edge segments comprise a first plurality of pixels along a first side of the block edge, the third and fourth edge segments comprise a second plurality of pixels along a second side of the block edge, the second side being parallel to the first side;
      swap a first pair of pixels from the first and third registers with a second pair of pixels from the second and fourth registers, wherein the first pair comprises a first pixel of the first edge segment and a first pixel of the third edge segment, and the second pair comprises a third pixel of the second edge segment and a third pixel of the fourth edge segment;
      filter the second pair and a third pair of pixels simultaneously in the first and third registers, the third pair comprising a third pixel of the first edge segment and a third pixel of the third edge segment;
      filter remaining pixels of the first and third edge segments, if results of filtering the third pair meet one or more predetermined criteria; and
      filter remaining pixels of the second and fourth edge segments, if results of filtering the second pair meet the one or more predetermined criteria.

21. The system of claim 20, wherein the first, second, third, and fourth registers comprise single instruction multiple data registers.

22. The system of claim 20, wherein the processor comprises a Wireless MMX processor.

23. The system of claim 20, wherein the steps of swapping, filtering the second pair and the third pair, filtering remaining pixels of the first and third edge segments, and filtering remaining pixels of the second and fourth edge segments are performed if the block edge is in an intra macroblock or a bidirectional macroblock.

24. The system of claim 20, wherein the steps of swapping, filtering the second pair and the third pair, filtering remaining pixels of the first and third edge segments, and filtering remaining pixels of the second and fourth edge segments are performed if the block edge is in a predicted macroblock and if the first, second, third, and fourth edge segments are to be filtered, based on a size, a residual coefficient, and a motion vector of the predicted macroblock.

25. A method of filtering pixels along a block edge during decoding of compressed video, comprising:
   loading, with at least one processor, a first pair of pixels in a first pair of registers;
   loading, with the at least one processor, a second pair of pixels in the first pair of registers;
   loading, with the at least one processor, a third pair of pixels in a second pair of registers;
   swapping, with the at least one processor, the second pair of pixels with the third pair of pixels so that both the first pair of pixels and the third pair of pixels are loaded in the first pair of registers;
   simultaneously filtering, with the at least one processor, the first pair of pixels and the third pair of pixels after swapping the second pair of pixels with the third pair of pixels;
   filtering other pixels loaded in the first pair of registers if results of filtering the first pair of pixels meet one or more predetermined criteria.

* * * * *